United States Patent [19]
Gould et al.

[11] 3,942,931
[45] Mar. 9, 1976

[54] METHOD AND APPARATUS FOR PRODUCING SEALING WASHERS

[76] Inventors: William Gould; Charna Gould, both of 93 Sagamore Road, Millburn, Essex Co.,, N.J. 07041

[22] Filed: Mar. 8, 1974

[21] Appl. No.: 449,274

[52] U.S. Cl. ................ 425/304; 72/417; 264/85
[51] Int. Cl.² B29C 17/02; B29C 17/14; B29C 24/00
[58] Field of Search........ 425/302, 392, 393, 324 R, 425/383, 145, 304; 72/84, 125, 312, 313, 391, 389, 317, 115, 354, 417, 112; 83/262; 10/11 R, 72 R, 11 A

[56] References Cited
UNITED STATES PATENTS

| | | | |
|---|---|---|---|
| 2,849,066 | 8/1958 | Michelet et al. | 83/262 |
| R25,131 | 3/1962 | Wilson | 72/125 |

*Primary Examiner*—Francis S. Husar
*Assistant Examiner*—Robert J. Charvat

[57] ABSTRACT

A machine for producing tubular fastener sealing members having rolled ends includes an apertured guide member cutting block backed by a pair of clamp members and which feeds tubular stock of resilient material between the clamp members through the guide block. A rotating knife is associated with the guide block and an axially reciprocating rotating shaft supports an edge rolling tool confronting and coaxial with the guide aperture. The components are motivated and sequenced to open the clamp until the tube is advanced to the tool, close the clamp, advance the tool to roll the tube leading edge, open the clamp and retract the tool which is followed by the tube, close the clamp, further retract the tool, and slice the finished product from the tube stock.

8 Claims, 11 Drawing Figures

METHOD AND APPARATUS FOR PRODUCING SEALING WASHERS

BACKGROUND OF THE INVENTION

The present invention relates generally to an improved method and apparatus for producing sealing members for screws, nails and similar fastener devices and it relates more particularly to an improved method and machine for producing tubular sealing members having rolled ends.

In U.S. Pat. No. 3,299,766 granted Jan. 24, 1967 to W. Gould, et al., there are disclosed various forms of sealing elements for fastener devices such as screws, bolts, nails and the like. These sealing elements are formed of a thermoplastic synthetic organic polymeric resin which is relatively stiff and deformable and possesses cold-flow properties and sealing elements of the subject type which are employed to great advantage as those illustrated in FIGS. 7, 8, and 12 of the above identified patent. The preferred form of sealing element includes a sleeve of a resin of the above nature having a rolled over rearwardly turned upper flange or washer portion. However, the preferred form of the sealing element possesses an important drawback in that it has heretofore been difficult to mass produce with great accuracy and is accordingly expensive and of non-uniform quality.

SUMMARY OF THE INVENTION

It is a principal object of the present invention to provide an improved method and apparatus for producing fastener sealing elements.

Another object of the present invention is to provide an improved method and apparatus for producing fastener sealing elements formed of a deformable thermoplastic resin in the shape of a sleeve having a rearwardly rolled end edge.

Still another object of the present invention is to provide an improved apparatus of the above nature characterized by its reliability, ruggedness, simplicity, low cost, low power consumption, high rate of uniform and precise production and great versatility and adaptability.

The above and other objects of the present invention will become apparent from a reading of the following description taken in conjunction with the accompanying drawing which illustrates a preferred embodiment thereof.

In a sense the present invention contemplates the provision of a machine for producing tubular sealing and locking elements for screws, nails or other fasteners or rivets including a guide member having a longitudinally extending guide opening, means for withdrawing plastic tubular stock from a source thereof and advancing it through the guide opening, a cutter located proximate the guide member and movable across the path of the tubular stock, an axially reciprocatable rotating spindle supporting a coaxial rolling tool at an end thereof confronting and coaxial with the guide opening and movable between advanced and retracted positions proximate to and remote from the guide member and sequencing means successively advancing the tubular stock through the guide opening into engagement with the rolling tool in at least a partially retracted position, stopping the tubular stock advance, advancing the rotating rolling tool to roll the leading end of the tubular stock, at least partially retracting the tool and advancing the tubular stock therewith, stopping the advance of the tubular stock and advancing the cutting means to sever a sealing element therefrom rearwardly of the rolled edge.

In the preferred form of the improved machine the tubular stock intermittent feed includes a pair of constantly running slip type feed rolls directing the tubular stock along a passageway delineated by a pair of channels formed in confronting faces of a pair of clamp members, one of which is stationary and the other being reciprocatable between clamp open and closed positions and the guide member is a plate generally transversely mounted on the front of the stationary clamp member, the guide opening being a circular opening in alignment with the clamp channels. The guide plate functions as a cutting block, the cutting means including a rotating knife traversing a path along the front face of the guide plate. The rolling tool has a coaxial shaped working face provided with an axial nipple. The sequencing means operates to open and close the clamp for effecting the advance and stopping of the tubular stock and following the rolling of the end edge of the tube. The tool is fully retracted to disengage the tube and thereafter the element is severed from the stock to fall into an underlying hopper.

The improved machine is reliable simple, rugged and highly versatile and the method results in precise and uniform production of a superior product.

BRIEF DESCRIPTION OF THE DRAWINGS

FIG. 10 is a front perspective view of a rolling tool forming part of the machine; and FIG. 11 is a longitudinal sectional view of sealing elements of different dimensions produced by the improved machine.

DESCRIPTION OF THE PREFERRED EMBODIMENT

Figure 1:
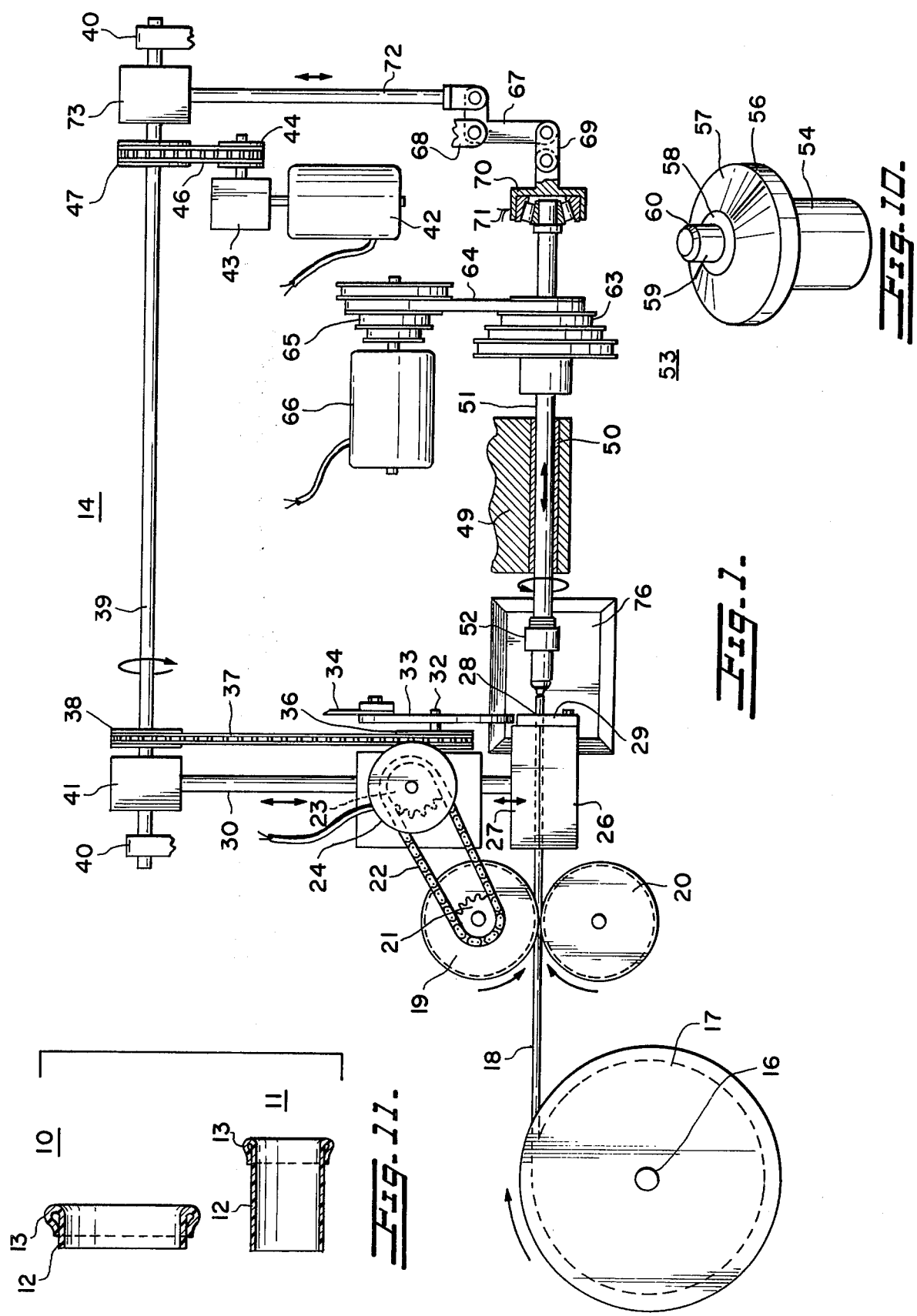
FIG. 1 is a top plan fragmentary view of a machine embodying the present invention.

Referring now to the drawings which illustrate a preferred embodiment of the present invention, the reference numerals 10 and 11, shown in FIG. 11, generally designate fastener sealing elements of different dimensions of the type produced by the present improved machine and method and which are described in detail in the above identified U.S. Pat. No. 3,299,766. Specifically, each of the sealing elements 10 and 11 is formed of deformable thermoplastic polymeric resin, such as nylon or the like, and includes a sleeve 12 which has at one end an outwardly rolled over rearwardly turned flange or lips 13 which extends to a point short of the opposite end of the sleeve 12 and juxtaposed to the sleeve.

The improved machine for producing the sealing elements is designated by the reference numeral 14 and includes an axle 16 or other means for freely rotatably supporting a reel 17 of tubular stock 18 formed of a deformable synthetic organic polymeric resin preferrably of the type possessing cold flow properties, for example, nylon or the like.

Disposed forwardly of the reel 17 are a pair of similar peripherally engaging feed wheels 19 and 20 having formed in their peripheral faces arcuate peripheral extending grooves which engage and withdraw and advance tubular stock 18 from reel 17 and under excess force impeding the advance of tubular stock 18 slip. Advantageously wheel 20 is freely rotatable and the wheel 19 is positively driven having coaxially affixed thereto a sprocket wheel 21 which is coupled by a sprocked chain 22 to a sprocket wheel 23 keyed to the drive shaft of an electric drive motor 24.

The feed wheels 19 and 20 advance the tubular stock 18 along a linear path between a pair of corresponding clamp members 26 and 27, when in their relatively open position and thence through a circular forwardly tapering guide opening 28 in a cutting block functioning transversely extending vertical guide plate 29. The clamp member 26 is stationary and the clamp member 27 is transversely movable into and out of stock clamping engagement with stationary clamp member 26 and is actuated by an axially reciprocatable actuating rod 30 extending transversely from and inserted to clamp member 27. Formed in the flat vertical longitudinally extending confronting faces of clamp members 26 and 27 are longitudinal arcuate grooves which extend for the full lengths of the clamp members 26 and 27, the grooves defining when the clamp members 26 and 27 abut, a circular bore of slightly less diameter than stock 18 and in longitudinal alignment with guide opening 28. The guide plate 29 is mounted on the front face of clamp member 26 and slidably engages the front face of movable clamp member 27.

Located rearwardly of the guide plate 29 and mounted on a shaft 32 is a cutter supporting disc 33. A cutter blade 34 having sharp longitudinal edges is replaceably clamped to the front face of 33 and projects radially therefrom and is of such length that with rotation of the disc 33, the blade 34 traverses a path along the front face of guide plate 29 across guide opening 28. Also keyed to the shaft 32 is a sprocket wheel 36 which is coupled by a sprocket chain 37 to a sprocket wheel 38 keyed to a main rearwardly located drive and sequencing shaft 39.

The shaft 39 extends along the length of the machine 14 and is supported at opposite ends by suitable bearing blocks 40. The shaft 39 is coupled by way of a motion translating mechanism 41 including a cam and follower of known construction to the slide rod 30 which is reciprocated to open and close the clamp members 26 and 27 in a sequence as will be hereinafter described. The shaft 39 is driven by a drive motor 42 which is connected by a speed reducer unit 43 to a sprocket wheel 44 which is coupled by a sprocket chain 46 to a sprocket wheel 47 keyed to shaft 39.

A bearing block 49 is spaced from and suitably mounted longitudinally forward of the guide plate 29 in a direction away from clamping members 26 and 27 and has a longitudinal bore telescoped by an elongated bearing bushing 50 longitudinally coaxially aligned with the guide opening 28. A spindle shaft 51 slidably and rotatably engages the bushing 50 and projects rearwardly to a point spaced forwardly of guide plate 29 and has mounted at its rear end a tool engaging chuck 52. Replaceably engaged by the chuck 52 is a rearwardly projecting coaxial edge rolling tool 53, one type being illustrated in FIG. 10.

The rolling tool 53 includes a cylindrical axial chuck engaging shank 54 and an enlarged circular front head 56. The working end faces 57 is of convex conical configuration terminating in a flat annular surface 58 from which projects a coaxial cylindrical nipple 59 having a beveled peripheral end edge 60. The diameter of nipple 59 is slightly less than the inside diameter of tubular stock 18. A pulley 63 is keyed to shaft 51 forwardly of block 49 and is connected by a flexible drive belt 64 to a pulley 65 mounted on the drive shaft of a motor 66.

A bell crank 67 is suitably mounted at its knee by a pivot bracket 68 for swinging about a vertical axis and has an end of one arm connected by a link 69 to the cup housing 70 of a thrust bearing 71 rotatably engaging the forward end of shaft 51 and axially movable therewith. The other arm of bell crank 67 is connected by a slide rod 72 to the output of a motion translation mechanism 73 of known construction including a cam and follower, the mechanism 73 being driven by shaft 39 to axially motivate and sequence the shaft as will be hereinafter explained.

Figure 2:
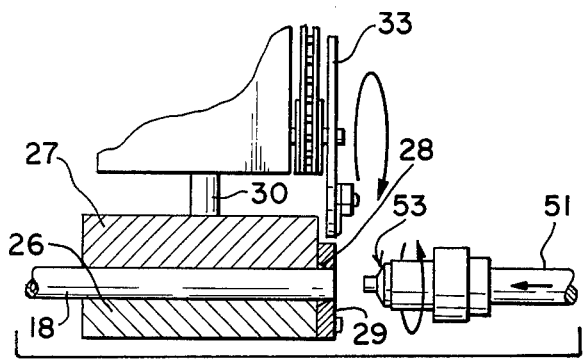
FIGS. 2–9 are top plan fragmentary views, partially in sections, of a portion of the machine in successive stages of an operation cycle.
Figure 3:
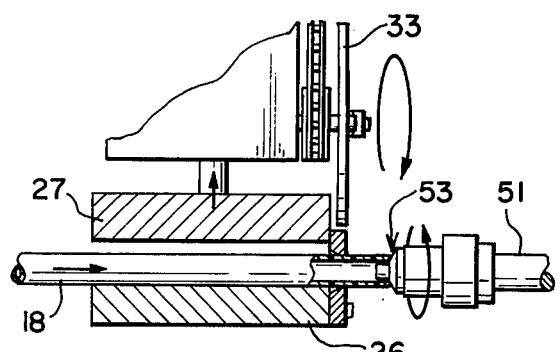
Figure 4:
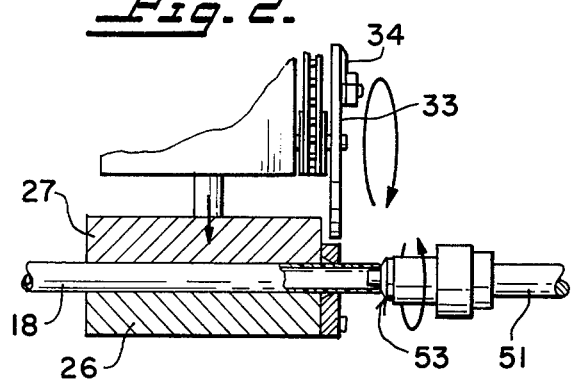
Figure 5:
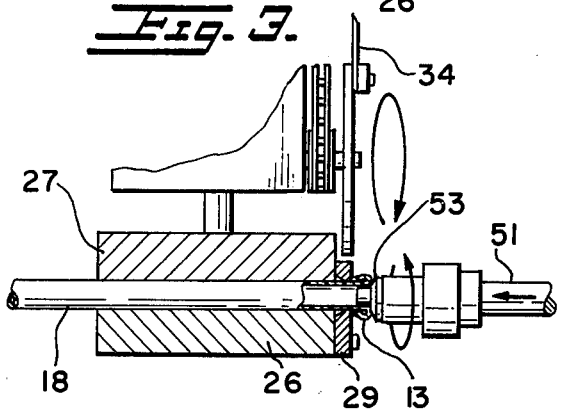

The translation mechanisms 41 and 73, drive shaft 39, clamp member 27 and longitudinally move spindle shaft 51 and so constructed and related as to effect the sequence of steps of the operating cycle as illustrated in FIGS. 2–9 of the drawings. In the initial position, as shown in FIG. 2, the clamp member 27 has been advanced to its closed position clamping the stock 18 with its leading end coplanar with the front face of guide plate 29 and the shaft 51 and tool 53 advanced to an intermediate position. The clamp member 27 is then retracted permitting the advance of the tubular stock 18 through the guide opening 28 into axial engagement with the tool 53 by the feed wheels 19 and 20 (FIG. 3). The clamp member 27 is then advanced to close the clamp and lock the tubular stock 18 against axial movement (FIG. 4). Thereafter, the shaft 51 and tool 53 are advanced to the left, the rotating tool 53 outwardly rearwardly rolling the exposed end of stock 18 to form the rearwardly extending outer flange 13 overlapping the exposed tubular stock until the end edge of the stock 18 reaches the front face of guide plate 29 (FIG. 5).

Figure 6:
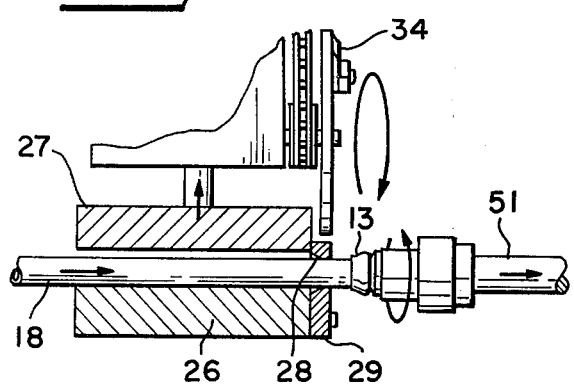
Figure 7:
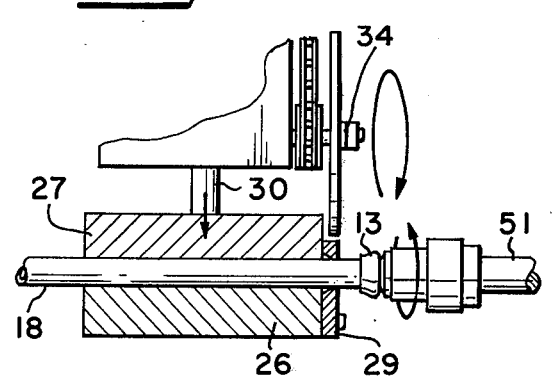
Figure 8:
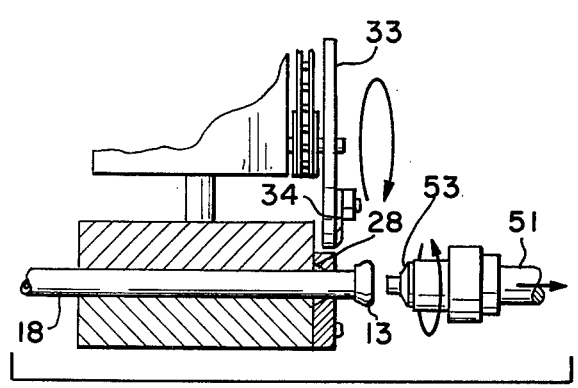
Figure 9:
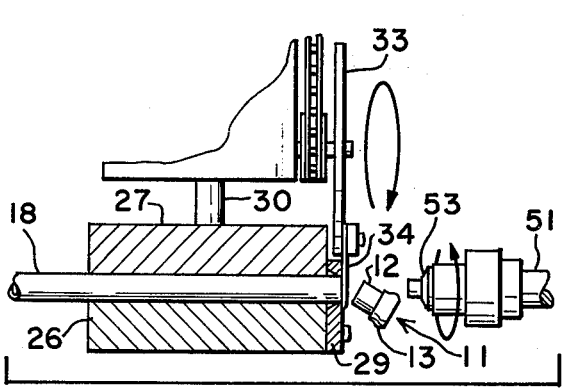

Thereafter the movable clamp member is retracted and the tool 53 and shaft 51 are retracted to an intermediate position depending on the desired length of the sleeve body of the sealing element 10 or 11, the stock 18 being advanced by feed wheels 19 and 20 to follow the retracting tool 53 (FIG. 6). The clamp member 27 is then advanced to a position locking the stock 18 (FIG. 7) and the tool 53 and shaft 51 are then fully retracted to disengage the stock 18 leaving the rolled leading end 13 (FIG. 8). The rotation of disc 33 is so timed that immediately following the full retraction of the tool 53 the cutting blade 34 moves across the stock 18 along the front face of guide plate 29 to sever the finished sealing element 11 from stock 18 (FIG. 9) and the severed sealing element 11 falls into an underlying hopper 76. The shaft 51 and tool 53 are then advanced to their intermediate position as shown in FIG. 2 to complete the cycle which is regularly repeated.

By rotating shaft 51, easier rolling over the edges is provided. By changing the shape of the tool 53 the outer edge can be flared, or partially rolled over, or fully rolled over as desired. While additional motors 24 and 66 are used besides motor 42 to allow easier substitution and replacement when necessary, a single driving means could be used. By providing a variable cam follower in mechanism 73 variable reciprocating movements of tool 53 can easily produce different lengths of sleeve for sealing members 10 and 11. Also, while one of the clamp members 26 and 27 were illustrated as being movable, the other member could be movable.

While there has been described and illustrated a preferred embodiment of the present invention, it is apparent that numerous alterations, omissions and additions may be made without departing from the spirit thereof. While the article produced by this invention has been discussed as a "sealing member", the article can be used for any purpose for which it is suited, such as a rivet, sleeve, or the like.

I claim:

1. A machine for producing tubular sealing elements comprising a guide member having a longitudinally extending guide opening motor driven intermittent feeding means for withdrawing plastic tubular stock from a source thereof and advancing it along a predetermined path coaxially extending through said guide opening, cutting means located proximate said guide member and movable across said predetermined path of said tubular stock, an axially reciprocatable spindle forward of and coaxial with said guide opening a motor driven rolling tool mounted on an end of said spindle and coaxially confronting said guide opening and movable with said spindle between advanced and retracted positions proximate and remote from said guide member respectively, means for rotating said spindle, and sequencing means successively advancing said tubular stock along said predetermined path through said guide opening into engagement with said rolling tool in at least a partially retracted position, interrupting the advance of said tubular stock, advancing said rotating spindle and tool to roll the leading end of said stock, at least partially retracting said tool and advancing said tubular stock, interrupting the advance of said tubular stock and advancing said cutting means across said tubular stock to sever a sealing element therefrom rearwardly of the rolled edge.

2. The machine of claim 1 wherein said intermittent feeding means includes a pair of clamp members disposed rearwardly of said guide member and movable between relatively closed and open positions, continuously driven means for advancing said tubular stock along a path between said clamp members through said guide opening and means for opening and closing said openings, for respectively effecting the advance and the stopping of said tubular stock.

3. The machine of claim 2 wherein said clamping members have a pair of longitudinally extending guide channels formed in the confronting faces thereof in axial alignment with said guide opening.

4. The machine of claim 3 wherein one of said clamp members is stationary and said guide member comprises a plate secured to the front face of said stationary clamp member and said guide opening is a circular bore formed in said plate coaxial with said channels when said clamp members are closed.

5. The machine of claim 2 wherein said rolling tool has a conical end face coaxial with and confronting said guide opening.

6. The machine of claim 5 including nipple axially projecting from said tool conical end face.

7. The machine of claim 2 including a chuck mounted in the end of said spindle and releasably engaging said rolling tool.

8. The machine of claim 1 wherein said sequencing means initially advances said tubular stock into engagement with said tool when said tool is between its fully advanced and fully retracted position and the advance of said tubular stock is interrupted following the rolling of the edge thereof before said tool is fully retracted and said element is severed upon the full retraction of said tool out of engagement with said tubular stock.

* * * * *